US007441414B2

(12) United States Patent
Ziehr et al.

(10) Patent No.: US 7,441,414 B2
(45) Date of Patent: Oct. 28, 2008

(54) METHOD FOR PRE-COOLING AUTOMOTIVE VEHICLE PASSENGER COMPARTMENT

(75) Inventors: Lawrence P. Ziehr, Clarkston, MI (US); Gregory A. Major, Farmington Hills, MI (US); Mark D. Nemesh, Troy, MI (US); George M. Claypole, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 590 days.

(21) Appl. No.: 10/961,694

(22) Filed: Oct. 8, 2004

(65) Prior Publication Data

US 2006/0075766 A1  Apr. 13, 2006

(51) Int. Cl.
*B60H 1/32* (2006.01)

(52) U.S. Cl. .............................. 62/244; 62/157; 62/180; 62/186; 62/229; 62/230; 62/231; 236/51; 165/202; 340/426.24; 340/426.28; 340/426.29; 340/438

(58) Field of Classification Search .................. 62/244, 62/157, 186, 230, 180, 231, 229; 236/51; 165/202; 340/426.24, 426.28, 426.29, 438
See application file for complete search history.

(56) References Cited

U.S. PATENT DOCUMENTS 3,740,712 A * 6/1973 Borgese et al. ......... 340/426.25
4,354,174 A * 10/1982 Heidman, Jr. ............ 340/426.3
5,791,407 A * 8/1998 Hammons .................... 165/202
6,158,225 A * 12/2000 Muto et al. .................... 62/3.7
6,745,582 B1 * 6/2004 Urbank et al. ................. 62/133
2002/0066281 A1 * 6/2002 Gunasekera .................. 62/186

FOREIGN PATENT DOCUMENTS

WO  WO 9909360 A1 * 2/1999

* cited by examiner

*Primary Examiner*—Cheryl Tyler
*Assistant Examiner*—Azim Rahim

(57) ABSTRACT

The present invention concerns a method for pre-cooling the passenger compartment of an automotive vehicle. The vehicle includes at least one electrically actuatable window and a HVAC system having at least a controller, a blower, a passenger compartment temperature sensor, and a HVAC ducting leading to the passenger compartment. The controller and the blower are connected to a vehicle battery. The method includes determining the passenger compartment temperature and comparing the temperature to a first predetermined value; cycling an blower inlet to an outside air intake position and operating the blower to provide pressurized air to the passenger compartment if the passenger compartment temperature is greater than the first predetermined value; opening the vehicle windows; comparing the passenger compartment temperature to a second predetermined value; and stopping operation of the blower when the passenger compartment temperature drops below the second predetermined value.

20 Claims, 5 Drawing Sheets

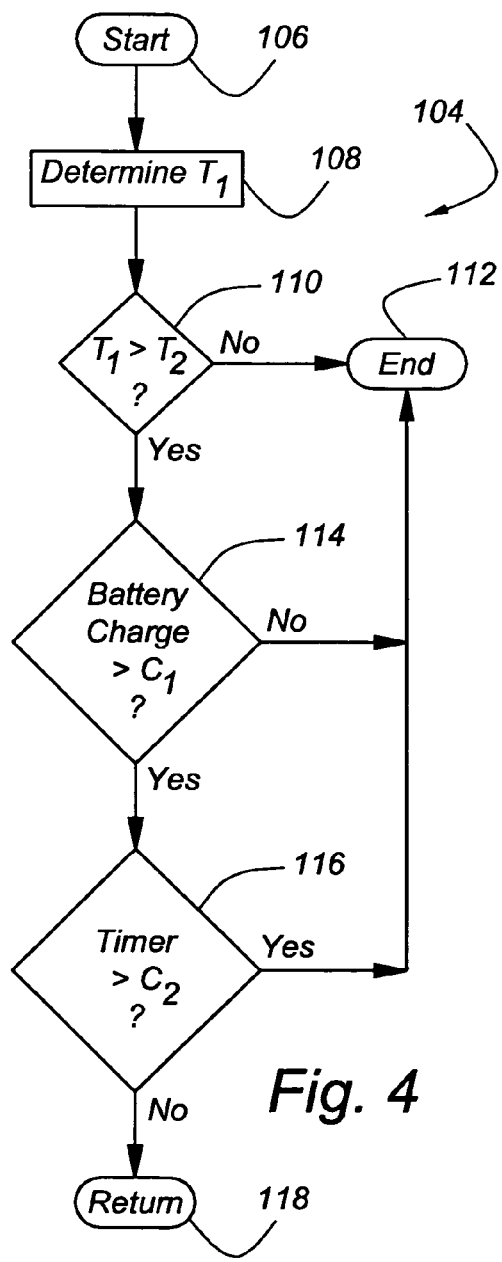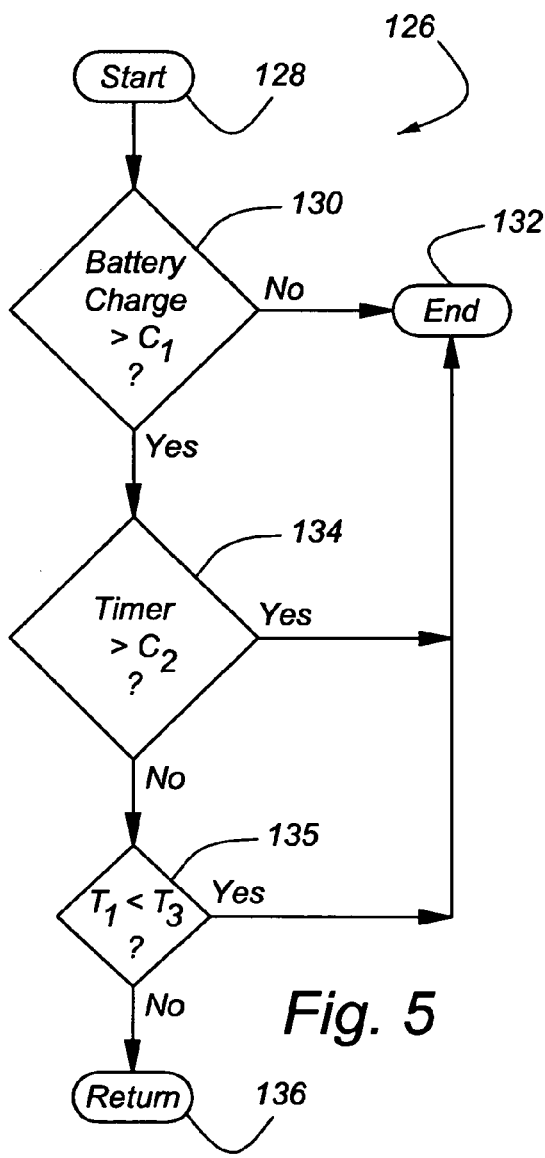
Fig. 4
Fig. 5

US 7,441,414 B2

METHOD FOR PRE-COOLING AUTOMOTIVE VEHICLE PASSENGER COMPARTMENT

BACKGROUND OF THE INVENTION

The present invention relates generally to automotive vehicle heating, ventilation, and air conditioning (HVAC) systems and, in particular, to a method for pre-cooling the passenger compartment of an automotive vehicle.

The passenger compartment of a vehicle parked in direct or indirect sunlight can become very hot, with temperatures greatly exceeding that of the ambient air temperature due to solar heat load on the window glass and the like. Vehicle owners often start a vehicle, engage the HVAC system to begin cooling the passenger compartment, and then exit the vehicle until the HVAC system actually begins to cool the passenger compartment. This method however, wastes fuel and increases the emissions of the vehicle. Remotely starting a vehicle and operating the HVAC system is also a known method for cooling the passenger compartment of the vehicle, however, this also wastes fuel and increases the emissions of the vehicle.

It is desirable, therefore, to provide a method for cooling an interior of a vehicle without operating the engine and thereby wasting fuel and producing vehicle emissions.

SUMMARY OF THE INVENTION

The present invention concerns a method for pre-cooling the passenger compartment of an automotive vehicle. The vehicle includes at least one electrically actuatable window and a HVAC system having at least a controller, a blower, at least one temperature sensor in the passenger compartment, and a HVAC ducting leading to the passenger compartment. The controller and the blower are connected to a vehicle battery. The method includes the steps of determining the temperature of the passenger compartment and comparing the temperature to a first predetermined value; cycling an inlet of the blower to an outside air intake position and operating the blower to provide pressurized air through the HVAC ducting to the interior of the vehicle if the temperature of the passenger compartment is greater than the first predetermined value; opening the windows of the vehicle; comparing the temperature of the passenger compartment to a second predetermined value; and stopping operation of the blower when the temperature of the passenger compartment drops below the second predetermined value.

Alternatively, the HVAC system includes a HVAC compressor and the method in accordance with the present invention further includes the steps of starting the compressor, cycling the inlet of the blower to a recirculated position, and closing the windows of the vehicle.

The method in accordance with the present invention is especially suited for those vehicles having electric-driven HVAC compressors, since the interior temperature may be cooled more quickly utilizing the HVAC system than utilizing ambient air only. The method in accordance with the present invention, however, may be advantageously utilized to pre-cool the passenger compartment of all types of vehicles regardless of the type of engine power plant or the type of prime mover of the refrigerant compressor including, but not limited to, non-hybrid vehicles with automatic climate control.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 3, 4, and 5 are flowcharts of a method of operating the HVAC system of FIGS. 1a, 1b, and 2 in accordance with the present invention.

DESCRIPTION OF THE PREFERRED EMBODIMENT

Figure 1A:
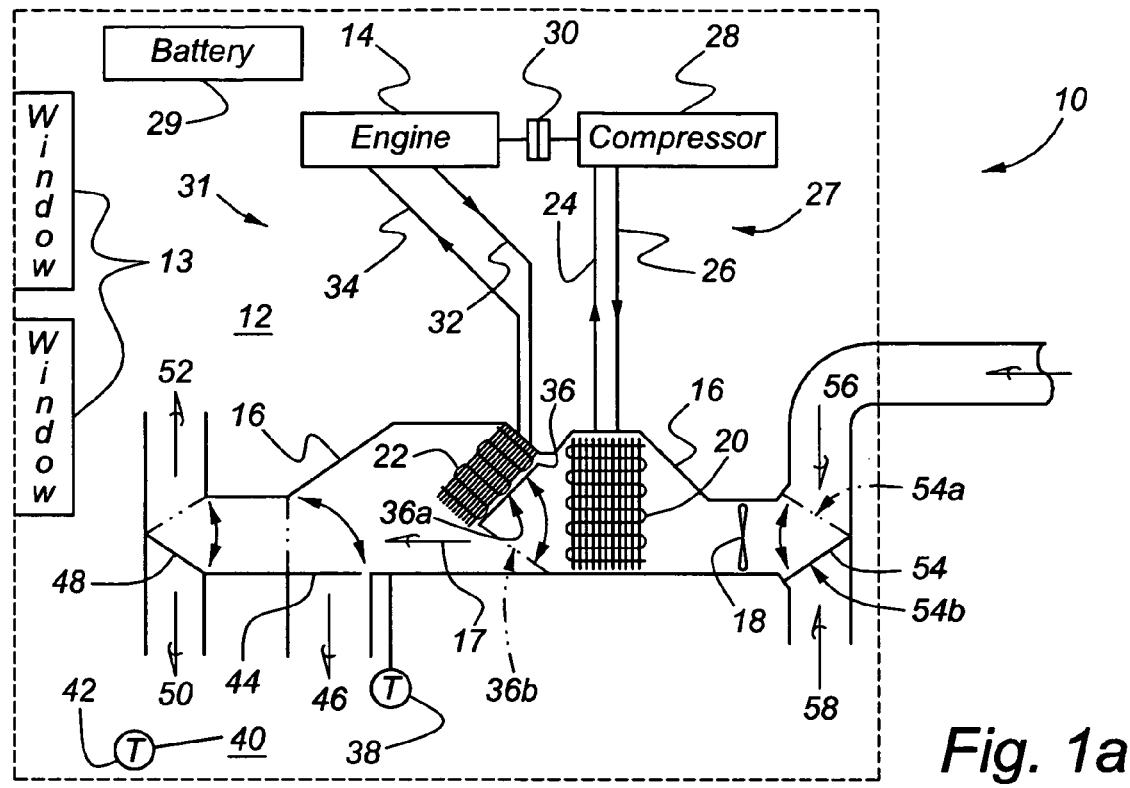
FIG. 1a is a schematic view of a HVAC system that can be advantageously employed to carry out a method of pre-cooling a passenger compartment of an automotive vehicle in accordance with the present invention.
Figure 1B:
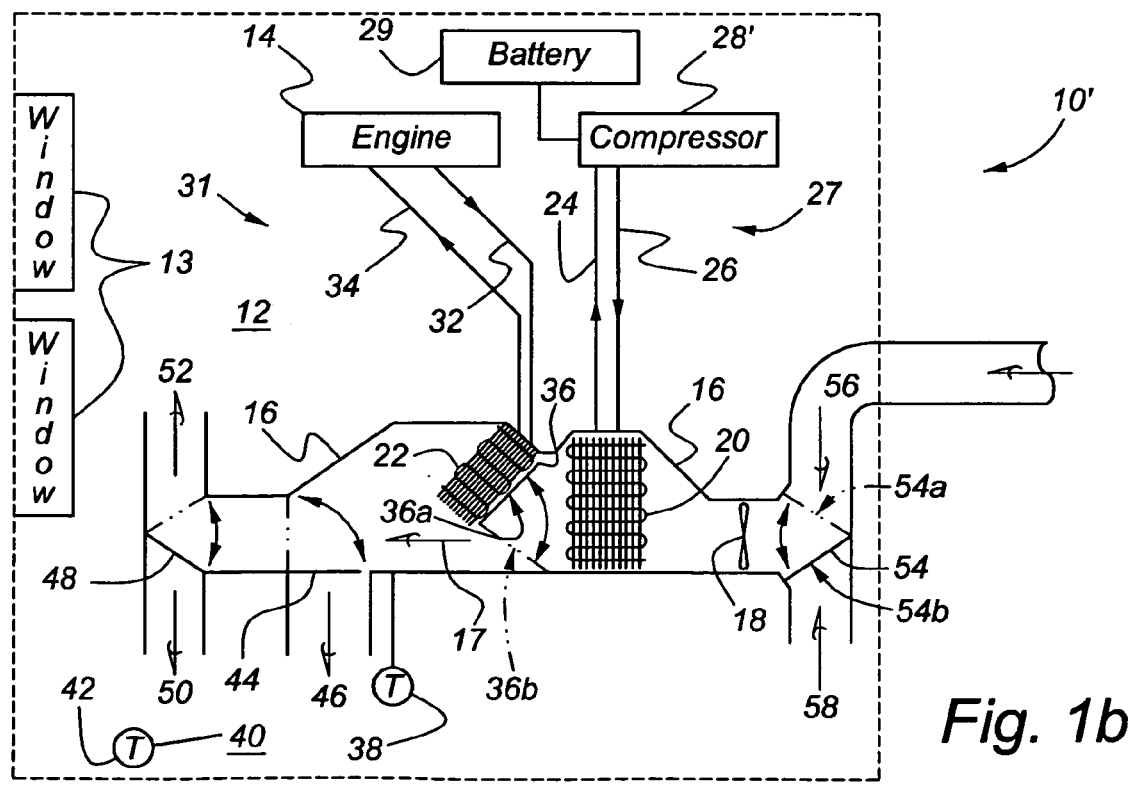
FIG. 1b is a schematic view of an alternative embodiment of a HVAC system that can also be employed to carry out a method of pre-cooling a passenger compartment of an automotive vehicle in accordance with the present invention.

Referring now to FIGS. 1a and 1b, a HVAC system is indicated generally at 10 in FIG. 1a and at 10' in FIG. 1b. The HVAC system 10 and 10' is disposed in a vehicle, indicated generally at 12. The vehicle 12 includes at least one and preferably a plurality of movable windows 13 formed therein. The vehicle 12 may be a hybrid vehicle having an internal combustion engine 14 operating in conjunction with a battery 29, best seen in FIG. 1b, a conventional vehicle having the internal combustion engine 14 only, or an electric vehicle having the battery 29 only. If the vehicle 12 is a hybrid vehicle or an electric vehicle, the battery 29 is preferably a large storage battery. Alternatively, the engine 14 may be replaced by a fuel cell (not shown) or the like. The HVAC system includes a HVAC air duct 16 and a blower 18 adapted to direct a flow of air in a direction indicated by an arrow 17 through the HVAC duct 16. An evaporator 20 is located within the HVAC duct 16 downstream of the blower 18. A heater core 22 is located within the HVAC duct 16 downstream of the evaporator 20. The evaporator 20 includes a refrigerant inlet 24 from and a refrigerant outlet 26 to a refrigerant circuit, indicated generally at 27, including a refrigerant compressor 28, shown in FIG. 1a. The compressor 28 is driven by the engine 14 through a clutch 30. The compressor 28 may be a fixed displacement compressor or a variable displacement compressor, as will be appreciated by those skilled in the art. A compressor 28', shown in FIG. 1b, is an electric-driven compressor connected to the vehicle battery 29. The compressor 28' may be a fixed displacement compressor or a variable displacement compressor, as will be appreciated by those skilled in the art. The refrigeration circuit 27, of course, may also include a condenser (not shown), a receiver/dryer (not shown), and a thermostatic expansion valve or orifice tube (not shown) in fluid communication with the compressor 28 and the evaporator 20. A refrigerant is contained in the refrigerant circuit 27 and so flows through the refrigerant inlet 24, the refrigerant outlet 26, the compressor 28 or 28', and the evaporator 20. The refrigerant is selectively circulated through the piping during operation of the HVAC system 10 or 10', discussed in more detail below. The heater core 22 has a coolant inlet 32 from and a coolant outlet 34 to an engine cooling circuit, indicated generally at 31, of the internal combustion engine 14. A coolant (not shown), such as a glycol/water mixture or the like, is contained in the engine cooling circuit 31 and thus flows through the coolant inlet 32, the coolant outlet 34, the engine 14, and the heater core 22. The coolant selectively circulates through the engine cooling circuit 31 during operation of the HVAC system 10 or 10', discussed in more detail below. A damper 36 is disposed in the HVAC duct 16 downstream of the evaporator 20 and adjacent the heater core 22. The damper 36 includes an actuator (not shown) such as an electric motor or the like that is operable to selectively expose and block the heater core 22 to an air flow from the blower 18. When the damper 36 is in a first position 36a, the air flowing from the blower 18 in the direction 17 bypasses the heater core 22. When the damper 36 is in a second position 36b, the air flowing from the blower 18 in the direction 17 flows through the heater core 22.

A duct temperature measurement device 38, such as a temperature sensor or the like, is disposed in the HVAC duct 16 downstream of the heater core 22. The HVAC air duct 16 extends to a passenger compartment, indicated schematically at 40. At least one passenger compartment temperature measurement device 42, such as a temperature sensor or the like, is disposed in the passenger compartment 40. A first damper 44 is disposed in the HVAC duct 16 downstream of the heater core 22 for distributing air to a floor outlet 46 in the passenger compartment 40. A second damper 48 is disposed in the HVAC duct 16 downstream of the heater core 22 for distributing air to either or both of a torso outlet 50 or a windshield outlet 52 in the passenger compartment 40. A recirculation damper 54 is disposed between an outside air intake (i.e. fresh air inlet) 56 and an inside air intake (i.e. recirculation air or return inlet) 58 from the passenger compartment 40 to supply air to the blower 18. The recirculation damper 54 can move between a first position 54a and a second position 54b. The recirculation damper 54 is operable to selectively provide only fresh air from the fresh air inlet 56 (when in the first position 54b), only recirculated air from the return inlet 58 (when in the second position 54a), or a mixture of fresh air and recirculated air to the blower 18. Each of the dampers 44, 48 and the recirculation damper 54 include an actuator (not shown) such as an electric motor or the like for moving the dampers 44, 48 and 54 between the respective closed and open positions.

Figure 2:
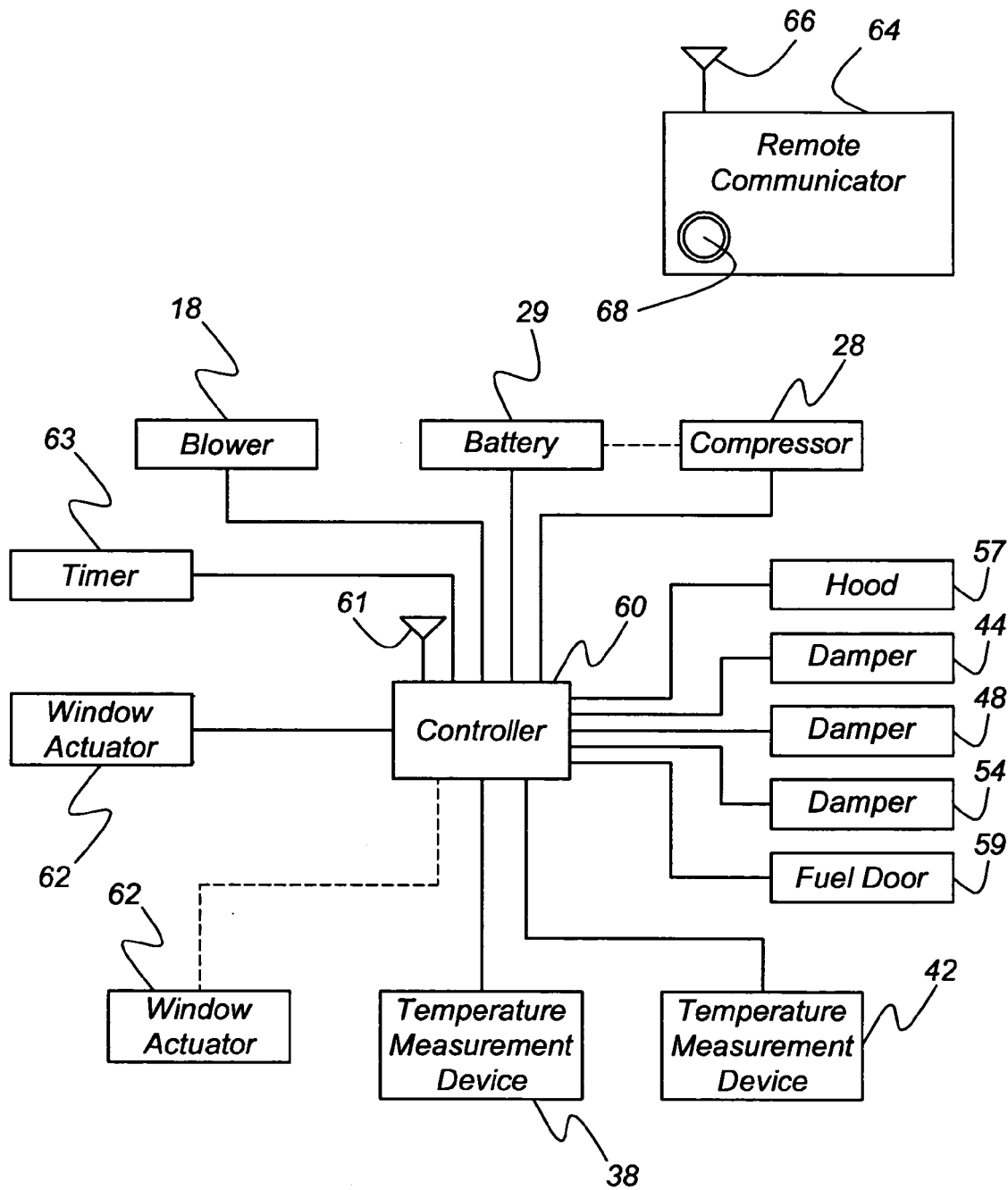
FIG. 2 is a block diagram of a HVAC system in accordance with the present invention.

Referring now to FIG. 2, the HVAC system 10 or 10' includes a controller 60 electrically connected to and operatively engaging the compressor 28 (through the clutch 30 shown in FIG. 1) or the compressor 28' (through the battery 29 shown in FIG. 2), the blower 18, the duct temperature measurement device 42, and the passenger compartment temperature measurement device 46. The controller 60 is electrically connected to and operatively engages the respective actuators of the dampers 44, 48 and 54. The controller 60 is electrically connected to and operatively engages at least one electrical actuator 62 for the at least one window 13 to open and close the at least one window 13 in a conventional manner known to those skilled in the art. The controller 60 is also connected to the battery 29 for measuring a power level of the battery 29 and to a timer 63 for initiating a timer during operation of the HVAC system 10 or 10'. The controller 60 is also connected to a hood sensor 57 and a fuel door sensor 59, which provide an indication of the status of the hood and fuel door, respectively, to the controller 60. The controller 60 is preferably an electronic control unit, such as an HVAC control unit or the like. The controller 60 may be a single microprocessor or a plurality of interconnected microprocessors. Furthermore, the controller 60 may be hardware, software, or any combination thereof as will be appreciated by those skilled in the art. The controller 60 is operable to receive signals, such as from the measurement devices 38 and 42 and the sensors 57 and 59 and to transmit commands, such as to the compressor 28 or 28', the blower 18, the actuators of the dampers 44, 48 and 54, and the at least one actuator 62 of the at least one window 13 during operation of the HVAC system 10 or 10', discussed in more detail below.

The controller 60 is also operable to receive commands or signals from a remote communicator 64. The remote communicator 64 includes a transmitter 66 for transmitting a signal when a push button 68 is actuated on the remote communicator 64. The remote communicator 64 is preferably a key fob remote control device or the like. A receiver 61 on the controller 60 is operable to receive the command or signal transmitted from the transmitter 66 on the remote communicator 64.

Figure 3:
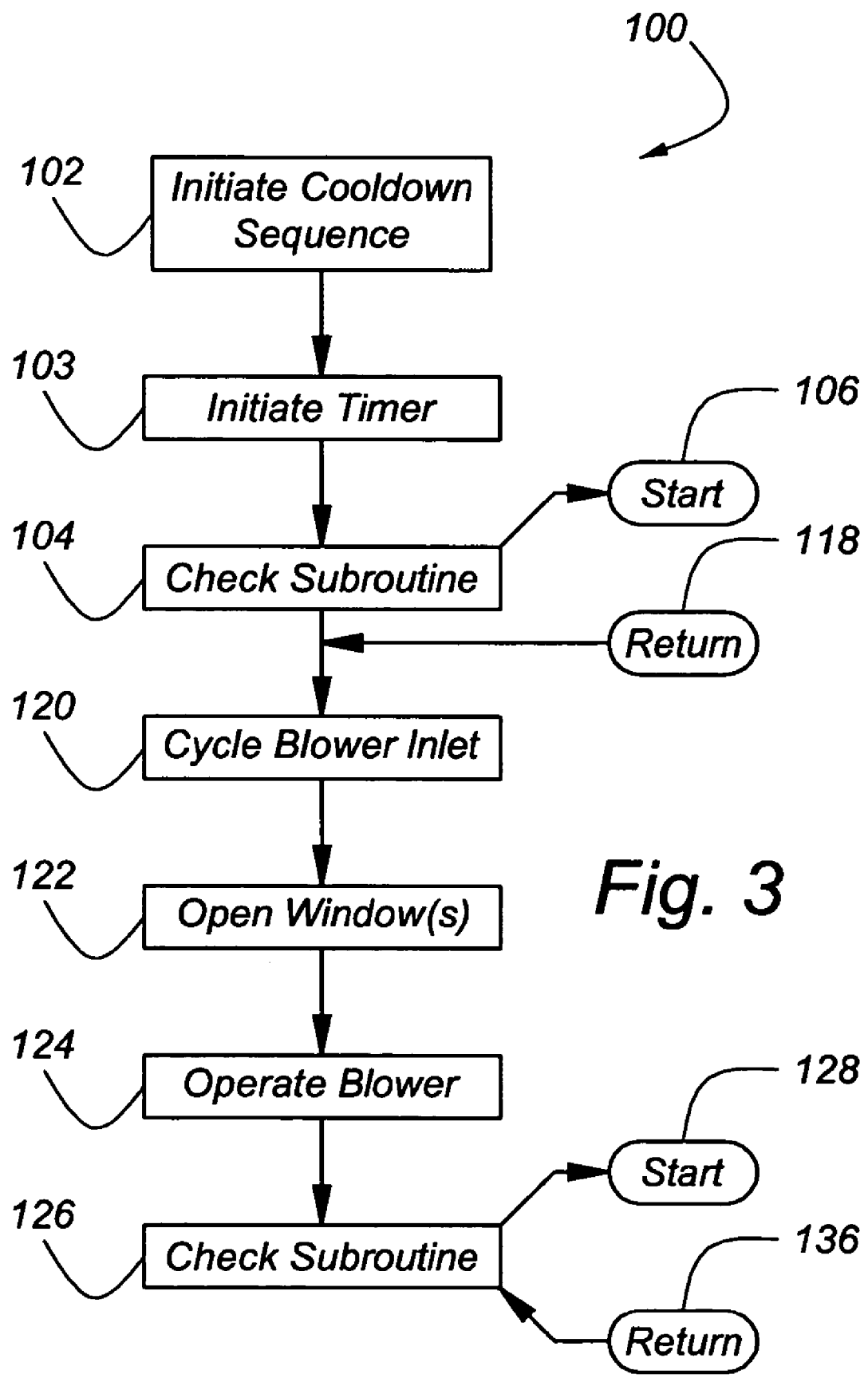

Referring now to FIG. 3, a flowchart of a method of operating the HVAC system 10 or 10' in accordance with the present invention is indicated generally at 100. In a step 102, a cooldown sequence is initiated. The cooldown sequence in the step 102 may be initiated by the vehicle owner actuating the push button 68 on the remote communicator 64 and initiating a command from the remote communicator 64. Alternatively, the cooldown sequence in the step 102 may be initiated by the controller 60 comparing the temperature of the passenger compartment 40 measured by the temperature measurement device 42 to a first predetermined value stored in the controller 60. If the temperature measured by the temperature measurement device 42 is greater than the first predetermined value, the cooldown sequence in the step 102 is initiated. In an alternative step 103, a timer, such as the timer 63 shown in FIG. 2, is initiated after the step 102. In a step 104, the method proceeds to a subroutine for verifying the HVAC system 10 or 10' is in condition to continue the method 100.

Referring now to FIG. 4, the subroutine 104 begins in a step 106 and proceeds to a step 108, where the temperature of the passenger compartment 40 ($T_1$) measured by the temperature measurement device 42 is determined by the controller 60. In a step 110, the vehicle interior temperature $T_1$ is compared to a second predetermined value ($T_2$) stored in the controller 60. The second predetermined value $T_2$ is preferably a lower temperature value at which it is not desirable to cool the passenger compartment 40. The step 110 may be skipped if the controller 60, rather than the vehicle owner actuating the push button 68 on the remote communicator 64, initiated the cooldown sequence in the step 102. If the measured temperature value $T_1$ is less than the second predetermined value $T_2$ (i.e., the temperature in the passenger compartment 40 has not reached a high value) the subroutine 104 proceeds to a step 112 and the subroutine 104 and the method 100 ends. If the measured temperature value $T_1$ is greater than the second predetermined value $T_2$, (i.e., the temperature in the passenger compartment 40 has reached a value where it is desirable to cool the passenger compartment 40) the subroutine 104 proceeds to a step 114, where the controller 60 compares a state of charge of the battery 29 with a predetermined state of charge value ($C_1$) stored in the controller 60. If the state of charge of the battery 29 is less than $C_1$ (i.e., the battery charge is too low to operate the various components of the HVAC system 10 or 10'), the subroutine 104 proceeds to the step 112 and the subroutine 104 and the method 100 ends.

If the state of charge of the battery 29 is greater than $C_1$, the subroutine 104 proceeds to a step 116, where a value of the timer 63 initiated in the step 103 is compared to a predetermined constant value ($C_2$) stored in the controller 60. The constant value $C_2$ is preferably equal to a maximum desired amount of time that the method 100 is expected to run. If the value of the timer 63 is greater than the constant value $C_2$, the subroutine 104 proceeds to a step 112 and the subroutine 104 and the method 100 ends. If the value of the timer 63 is less than the constant value $C_2$, the HVAC system 10 or 10' is in condition to continue the method 100 and the subroutine 104 proceeds to a step 118, where the subroutine 104 ends and returns to the method 100 after the step 104. Those skilled in the art will appreciate that other steps may be added to the method 100 while remaining within the scope of the present invention including, but not limited to, a step of comparing the value of $T_1$ with at least another predetermined temperature value, and stopping operation of the method 100 if the value of $T_1$ is below the at least another predetermined temperature value.

In a step 120, the controller 60 provides a signal to the actuator of the damper 54 to cycle the inlet of the blower 18 to the position 54b, where only fresh air from the fresh air inlet 56 is provided to the blower 18. The method 100 then proceeds to a step 122, where the controller 60 provides a signal to the at least one actuator 62 of the at least one window 13 to open the at least one window 13. Preferably in the step 122, the at least one window 13 is opened a small predetermined distance, such as twenty five millimeters or the like. By opening the at least one window 13 the small predetermined distance in the step 122, the security of the vehicle 12 is not compromised and the passenger compartment 40 of the vehicle 12 is not exposed to inclement weather or airborne contaminants. The method 100 then proceeds to a step 124, wherein the controller 60 sends a signal to operate the blower 18, bringing fresh air from the fresh air inlet 56 into the passenger compartment 40 through the outlets 46, 50, and 52, and forcing the hot air in the passenger compartment 40 out the opened window(s) 13. The blower 18, when operating, pressurizes the passenger compartment 40 and, therefore, the predetermined distance that the windows 13 are opened functions as a nozzle to force the hot air in the passenger compartment 40 through the opened windows 13 while minimizing the fresh air flowing out through the windows 13. After the blower 18 has begun operation in the step 124 and preferably after a predetermined period of time, the method 100 proceeds to the step 126, where the method proceeds to another subroutine to verify that the HVAC system 10 or 10' is in condition to continue the method 100.

Referring now to FIG. 5, the subroutine 126 begins in a step 128 and proceeds to a step 130, where the controller 60 compares a state of charge of the battery 29 with the predetermined state of charge value ($C_1$) stored in the controller 60, similar to the step 114 shown in FIG. 4. If the state of charge of the battery 29 is less than $C_1$ (i.e., the battery charge is too low to operate the various components of the HVAC system 10 or 10'), the subroutine 126 proceeds to a step 132 and the subroutine 126 and the method 100 ends. Preferably, the operation of the blower 18 is stopped when the subroutine 126 and method 100 ends in the step 132. Optionally, the windows 13 of the vehicle 12 are also closed in the step 132. If the state of charge of the battery 29 is greater than $C_1$, the subroutine 126 proceeds to a step 134, where a value of the timer 63 initiated in the step 103 is compared to the predetermined constant value ($C_2$) stored in the controller 60, similar to the step 116 shown in FIG. 4. The constant value $C_2$ is preferably equal to a maximum desired amount of time that the method 100 is expected to run. If the value of the timer 63 is greater than the constant value $C_2$, the subroutine 126 proceeds to the step 132 and the subroutine 126 and the method 100 ends. If the value of the timer 63 is less than the constant value $C_2$, the method proceeds to a step 135, where the vehicle interior temperature $T_1$ is compared to a third predetermined value ($T_3$) stored in the controller 60. The third predetermined value $T_3$ is preferably a lower temperature value at which it is desirable to stop cooling the passenger compartment 40. If the measured temperature value $T_1$ is less than the third predetermined value $T_3$ (i.e., the temperature in the passenger compartment 40 is sufficiently cooled) the subroutine 126 proceeds to the step 132 and the subroutine 126 and the method 100 ends. If the measured temperature value $T_1$ is greater than the third predetermined value $T_3$, the HVAC system 10 or 10' is in condition to continue the method 100 and the subroutine 104 proceeds to a step 136, where the subroutine 126 ends and returns to the method 100 at the step 126. The method 100 then continues in a loop of the subroutine 126 while the blower 18 operates to cool the passenger compartment 40. The blower 18 will continue to operate, therefore, while the state of charge of the battery 29 is greater than the value of $C_1$ and the value of the timer 63 is less than the value of $C_2$.

The method 100 in accordance with the present invention advantageously can pre-cool the temperature of a passenger compartment 40 within a short period of time after the sequence is initiated in the step 102 and can advantageously be accomplished prior to the occupants of the vehicle entering the vehicle. In testing, for example, a temperature in the passenger compartment 40 was lowered ten degrees Fahrenheit in less than one minute. Obviously, the amount of cooling and the amount of time taken to lower the temperature of the passenger compartment 40 is a function of the starting temperature of the passenger compartment 40, the ambient outside air temperature, and the solar heat load on the vehicle 12 as well as the state of charge of the battery 29 when the method 100 begins at the step 102.

Figure 6:
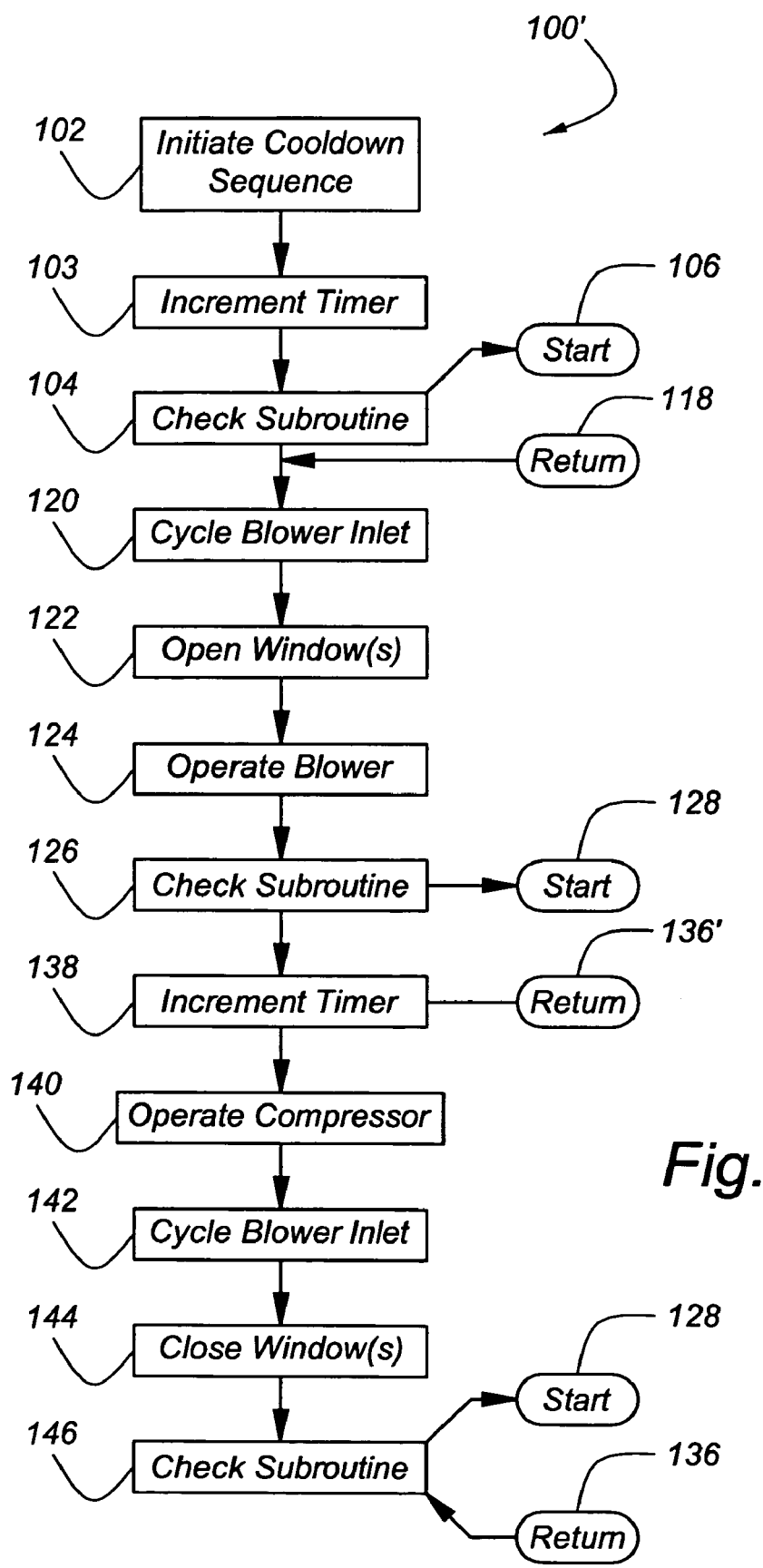
FIG. 6 is a flowchart of an alternative method of operating the HVAC system of FIGS. 1b and 2 in accordance with the present invention.

Referring now to FIG. 6, a flowchart of an alternative method of operating the HVAC system 10' in accordance with the present invention is indicated generally at 100'. The method includes the steps 102 through 134 in FIGS. 3-5 as described above. In the method 100', after the subroutine 126 proceeds to the step 136, instead of looping through the subroutine 126 until the state of charge of the battery 29 is less than $C_1$ or the value of the timer 63 is greater than $C_2$, the method 100' proceeds to a step 138, where a timer, such as the timer 63 shown in FIG. 2 or another timer, is incremented. Alternatively, the method 100' proceeds directly to a step 140 after the expiration of a predetermined period of time, as will be appreciated by those skilled in the art.

In the step 140, the controller 60 sends a signal to operate the compressor 28' and the refrigerant contained in the refrigerant circuit 27 begins flowing through the refrigerant inlet 24, the refrigerant outlet 26, the compressor 28', and the evaporator 20 and the refrigerant absorbs heat from the air flowing in the HVAC duct through the evaporator 20 in a well known manner. After a predetermined period of time (which allows the refrigerant to begin cooling the air in the HVAC duct 16), the method 100' proceeds to a step 142, where the controller 60 provides a signal to the actuator of the damper 54 to cycle the inlet of the blower 18 from the position 54b to the position 54a, where only recirculated air from the return air inlet 58 is provided to the blower 18. After the step 142, the method proceeds to a step 144, where the controller 60 provides a signal to the at least one actuator 62 of the at least one window 13 to close the at least one window 13. With the damper 54 in the position 54a, the blower 18 is providing cooled and recirculated air to the passenger compartment 40 through the HVAC duct 16 and cooling the passenger compartment 40. Alternatively, the step 144 may be skipped and the method proceeds directly to a step 146. In the step 146, the method 100' proceeds to the subroutine 128 shown in FIG. 5 and outlined in more detail above. The method 100' then continues in a loop of the subroutine 126 while the blower 18 and the compressor 28' operates to cool the passenger compartment 40. The blower 18 and the compressor 28' will continue to operate, therefore, while the state of charge of the battery 29 is greater than the value of $C_1$ and the value of the timer 63 is less than the value of $C_2$. In addition, the method 100' will also stop upon a signal received by the controller 60 from the hood sensor 57 indicating that the hood is opened or upon a signal received by the controller 60 from the fuel door sensor 59 indicating the fuel door is opened. Those skilled in the art will appreciate that other interlocks and shutdowns may stop the methods 100 or 100' while remaining within the scope of the present invention. Preferably, the operation of the blower 18 is stopped and the windows 13 of the vehicle 12 are closed when the subroutine 126 and method 100' ends in the step 132. Optionally, the windows 13 of the vehicle 12 are also closed in the step 132.

The method 100' in accordance with the present invention advantageously can pre-cool the interior temperature of a vehicle within a short period of time after the sequence is initiated in the step 102 and can advantageously be accomplished prior to the occupants of the vehicle entering the vehicle. In testing, for example, a temperature in the passenger compartment 40 was lowered forty degrees Fahrenheit in less than four minutes. Similar to the method 100, the amount of cooling and the amount of time taken to lower the temperature of the passenger compartment 40 in the method 100' is a function of the starting temperature of the passenger compartment 40, the ambient outside air temperature, and the solar heat load on the vehicle 12 as well as the state of charge of the battery 29 when the method 100' begins at the step 102.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for pre-cooling a passenger compartment of an automotive vehicle, the vehicle including at least one electrically actuatable window and a HVAC system having at least a controller, a blower, at least one temperature sensor in the passenger compartment, and a HVAC ducting leading to the passenger compartment, said controller and said blower connected to a vehicle battery, comprising the steps of:
   a) determining the temperature of the passenger compartment and comparing the temperature to a first predetermined value;
   b) cycling an inlet of said blower to an outside air intake position and operating said blower to provide pressurized air through said HVAC ducting to said passenger compartment of said vehicle if said temperature of said passenger compartment is greater than said first predetermined value;
   c) opening said windows of said vehicle;
   d) comparing the temperature of the passenger compartment to a second predetermined value; and
   e) stopping operation of the blower when a fuel door open signal is detected.

2. The method according to claim 1 wherein step a) is further defined by operating a remote communicator and initiating a command to said controller prior to determining the temperature of the passenger compartment.

3. The method according to claim 1 wherein step a) is further defined by said controller monitoring a temperature in said passenger compartment and automatically initiating the cooldown sequence if the monitored temperature in said passenger compartment rises above a predetermined value.

4. The method according to claim 1 wherein step d) is performed until a state of charge of said battery is less than a predetermined charge value.

5. The method according to claim 1 wherein step c) is further defined by initating a timer and step d) is performed until said timer reaches a predetermined value.

6. The method according to claim 1 wherein said HVAC system includes a refrigerant compressor connected to said vehicle battery and including a step of cycling an inlet of said blower to an inside air intake position and operating said refrigerant compressor while said blower is operating.

7. The method according to claim 6 including a step of closing said windows of said vehicle after commencing operation of said refrigerant compressor.

8. The method according to claim 1 wherein step b) is performed by actuating a damper in said HVAC ducting.

9. The method according to claim 1 wherein in step c) said windows are opened a predetermined distance.

10. The method according to claim 1 wherein step a) is performed by said at least one temperature sensor providing a signal to said controller.

11. The method according to claim 1 including a step of stopping operation of the blower and closing said windows of said vehicle when said temperature of said passenger compartment drops below said second predetermined value.

12. A method for pre-cooling a passenger compartment of an automotive vehicle, the vehicle including at least one electrically actuatable window and a HVAC system having at least a controller, a blower, a refrigerant compressor, at least one temperature sensor in the passenger compartment, and a HVAC ducting leading to the passenger compartment, said controller, said blower, and said compressor connected to a vehicle battery, comprising the steps of:
   a) initiating a cooldown sequence;
   b) determining the temperature of said passenger compartment and compared the temperature to a first predetermined value;
   c) cycling an inlet of said blower to a recirculation position if said temperature of said passenger compartment is greater than said first predetermined value;
   d) opening said windows of said vehicle;
   e) operating said blower to provide pressurized air through said HVAC ducting to the interior of said vehicle;
   f) operating said refrigerant compressor;
   g) monitoring a power level of said vehicle battery;
   h) comparing the temperature of the passenger compartment to a second predetermined value; and
   i) stopping operation of said blower and said compressor when one of a hood open signal and a fuel door open signal is detected by said controller.

13. The method according to claim 12 wherein step a) is performed by operating a remote communicator and initiating a command to said controller.

14. The method according to claim 12 wherein step a) is performed by said controller monitoring a temperature in said passenger compartment and automatically initiating the cooldown sequence if the monitored temperature in said passenger compartment rises above a predetermined value.

15. The method according to claim 12 wherein step c) is further defined by initiating a timer, and including step j) stopping operation of said blower and said compressor when said timer reaches a predetermined value.

16. The method according to claim 12 including a step of stopping operation of said blower and said compressor when said power level of said battery drops below a predetermined value.

17. The method according to claim 12 including a step of closing said windows of said vehicle after commencing operation of said refrigerant compressor.

18. The method according to claim 12 wherein in step d) said windows are opened a predetermined distance.

19. A method for pre-cooling the passenger compartment of an automotive vehicle, the vehicle including at least one electrically actuatable window and a HVAC system having at least a controller, a blower, a refrigerant compressor, at least one temperature sensor in the passenger compartment, and HVAC ducting leading to the passenger compartment, said controller, said blower, and said compressor connected to a vehicle battery comprising the steps of:
  a) providing a remote communicator;
  b) initiating a command from said remote communicator to said controller to initiate a cooldown sequence;
  c) determining the temperature of the passenger compartment and compared the temperature to a first predetermined value;
  d) cycling an inlet of said blower to a recirculation position if said temperature of said passenger compartment is greater than said first predetermined value;
  e) opening said windows of said vehicle;
  f) operating said blower to provide pressurized air through said HVAC ducting to the interior of said vehicle;
  g) operating said refrigerant compressor;
  h) monitoring a power level of said vehicle battery;
  i) comparing the temperature of the passenger compartment to a second predetermined value; and
  j) stopping operation of said blower and said compressor when a hood open signal is detected.

20. The method according to claim 19 including a step of stopping operation of said blower and said compressor when said temperature of the passenger compartment drops below said second predetermined value or when said power level of said battery drops below a predetermined value.

* * * * *